(12) United States Patent
Raghavachari et al.

(10) Patent No.: US 11,477,728 B2
(45) Date of Patent: Oct. 18, 2022

(54) SYSTEMS AND METHODS FOR NETWORK-ASSISTED RADIO ACCESS NETWORK SELECTION FOR A USER EQUIPMENT

(71) Applicant: Verizon Patent and Licensing Inc., Basking Ridge, NJ (US)

(72) Inventors: Balaji L. Raghavachari, Bridgewater, NJ (US); Michael A. Lombardo, Bethlehem, PA (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 75 days.

(21) Appl. No.: 17/175,784

(22) Filed: Feb. 15, 2021

(65) Prior Publication Data
US 2022/0264437 A1 Aug. 18, 2022

(51) Int. Cl.
*H04W 48/16* (2009.01)
*H04W 48/18* (2009.01)
*H04W 68/00* (2009.01)
*H04W 28/02* (2009.01)

(52) U.S. Cl.
CPC ....... *H04W 48/18* (2013.01); *H04W 28/0284* (2013.01); *H04W 48/16* (2013.01); *H04W 68/005* (2013.01)

(58) Field of Classification Search
CPC . H04W 48/18; H04W 28/0284; H04W 48/16; H04W 68/005
See application file for complete search history.

(56) References Cited

U.S. PATENT DOCUMENTS

| | | | |
|---|---|---|---|
| 9,380,494 B2* | 6/2016 | Sirotkin | H04W 28/0289 |
| 9,706,423 B2* | 7/2017 | Horn | H04W 24/10 |
| 10,368,297 B2* | 7/2019 | Lindheimer | H04W 48/14 |
| 2015/0003253 A1* | 1/2015 | Wolfner | H04W 28/08 370/237 |
| 2017/0331577 A1* | 11/2017 | Parkvall | H04W 4/00 |
| 2018/0035342 A1* | 2/2018 | Fujishiro | H04W 36/0085 |
| 2018/0270791 A1* | 9/2018 | Park | H04W 68/025 |
| 2019/0053120 A1* | 2/2019 | Park | H04W 74/0833 |
| 2019/0116585 A1* | 4/2019 | Chakraborty | H04W 72/042 |
| 2022/0150726 A1* | 5/2022 | Laselva | H04W 52/0245 |

* cited by examiner

*Primary Examiner* — Julio R Perez

(57) ABSTRACT

Embodiments described herein provide for a network-assisted determination by one or more User Equipment ("UEs") to connect to a licensed network (e.g., a Fifth Generation ("5G") radio access network ("RAN")) in situations where both the licensed network and one or more unlicensed networks (e.g., one or more WiFi networks) are in range of the UE. Such connection to a licensed network (e.g., in lieu of an unlicensed network) may provide for better performance and/or access to resources not otherwise accessible via an unlicensed network.

20 Claims, 11 Drawing Sheets

US 11,477,728 B2

SYSTEMS AND METHODS FOR NETWORK-ASSISTED RADIO ACCESS NETWORK SELECTION FOR A USER EQUIPMENT

BACKGROUND

Wireless user equipment ("UE"), such as mobile telephones or other wireless communication devices, may wirelessly communicate via licensed networks, such as Long-Term Evolution ("LTE") networks, Fifth Generation ("5G") networks, or the like. UEs may also wirelessly communicate via unlicensed networks, such as WiFi networks. In situations where a given UE is within communications range of both licensed and unlicensed networks, the UE may connect to the unlicensed network instead of the licensed network.

DETAILED DESCRIPTION OF EXAMPLE EMBODIMENTS

The following detailed description refers to the accompanying drawings. The same reference numbers in different drawings may identify the same or similar elements.

In situations where a given UE is within communications range of both licensed networks (e.g., a LTE radio access network ("RAN"), a 5G RAN, and/or some other type of licensed network) and unlicensed networks (e.g., a WiFi network and/or some other type of unlicensed network), the UE may automatically connect to the unlicensed network instead of the licensed network. In some situations, it may be preferable for the UE to connect to the licensed network, even in situations where the unlicensed network is available for connection. For example, the licensed network may include, and/or may be communicatively coupled to, processing resources (e.g., a Multi-Access/Mobile Edge Computing ("MEC") device, referred to sometimes herein simply as a "MEC") and/or other resources that are not otherwise necessarily accessible via the unlicensed network. MECs or other such network resources may have relatively substantial processing power, and/or may communicate with UEs (e.g., via a licensed network) with lower latency than application servers or other resources that communicate with UEs via an unlicensed network.

Additionally, such network resources may have access to application programming interfaces ("APIs"), UE location data, proprietary and/or secure data, and/or other resources that are not otherwise provided or available via an unlicensed network. Further, in some embodiments, performance of the licensed network may be similar to, or potentially better than (e.g., higher throughput, lower latency, lower jitter, etc.) performance associated with the unlicensed network, when UEs communicate with application servers or other resources via the licensed network instead of via the unlicensed network.

Embodiments described herein provide for a network-assisted determination by one or more UEs to connect to a licensed network (e.g., a 5G RAN) in situations where both the licensed network and one or more unlicensed networks (e.g., one or more WiFi networks) are in range of the UE. As noted above, such connection to a licensed network (e.g., in lieu of an unlicensed network) may provide for better performance and/or access to resources not otherwise accessible via an unlicensed network.

Figure 1:
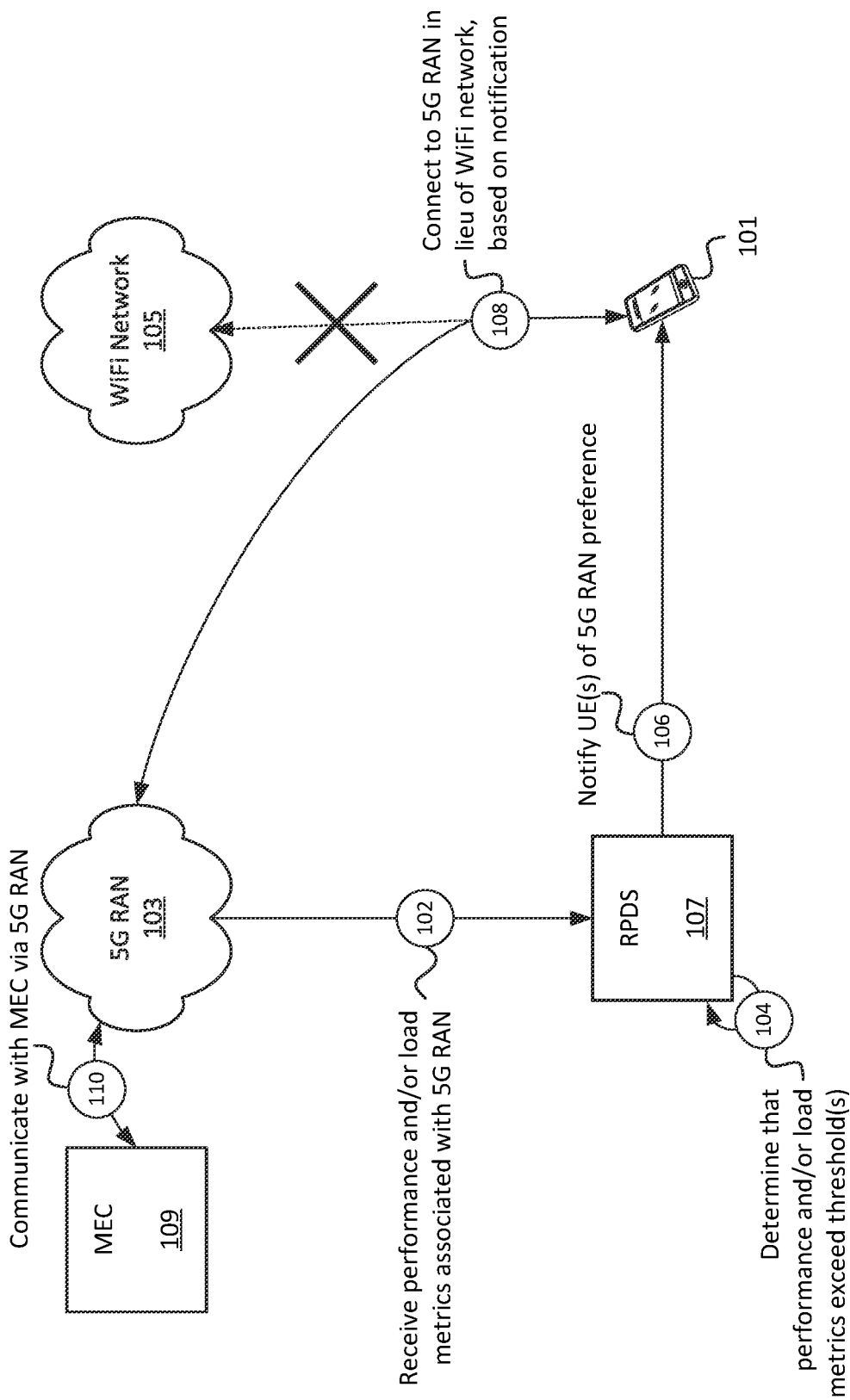
FIGS. 1-3 illustrate an example overview of one or more embodiments described herein.

As shown in FIG. 1, for example, UE 101 may be within wireless communication range of multiple wireless networks, including a licensed network (e.g., 5G RAN 103) and an unlicensed network (e.g., WiFi network 105). As used herein, the term "licensed network" may refer to a network that utilizes a portion of the radio frequency ("RF") spectrum (e.g., one or more frequencies, frequency bands, frequency sub-bands, etc.), for which access is controlled or regulated by some authoritative entity, such as a governmental agency or other regulatory body. For example, such entities may grant exclusive use of such portions of the RF spectrum to one or more wireless network operators or "carriers." The term "unlicensed network" may refer to a network that utilizes a portion of the RF spectrum for access may not require a license to utilize, and/or for which exclusive access is not granted to any particular network operator or carrier.

Licensed wireless networks may include RANs via which UEs may wirelessly connect to one or more base stations in order to send and/or receive data wirelessly. Licensed RANs may include, for example, 5G RANs, LTE RANs, Third Generation ("3G") RANs, Code Division Multiple Access ("CDMA") RANs, and/or other types of licensed RANs. Unlicensed wireless networks may include WiFi networks (e.g., implementing a Institute of Electrical and Electronics Engineers ("IEEE") 802.11 standard or other suitable standard), Bluetooth personal area networks ("PANs"), and/or other types of unlicensed networks. While the examples referred to herein are presented in the context of 5G RAN 103 and WiFi network 105, some embodiments may implement similar concepts in other types of licensed and/or unlicensed networks, respectively.

RAN Preference Determination System ("RPDS") 107 may receive (at 102) performance metrics, load metrics, and/or other information associated with 5G RAN 103. RPDS 107 may communicate with 5G RAN 103 via an X2 interface with one or more base stations associated with 5G RAN 103, may communicate with one or more mobility elements (e.g., an Access and Mobility Management Function ("AMF")) associated with 5G RAN 103, may communicate with one or more session management elements (e.g., a Session Management Function ("SMF")) associated with 5G RAN 103, and/or may otherwise be communicatively coupled to one or more device or systems associated with 5G RAN 103 that provide such information associated with 5G RAN 103.

Performance metrics associated with 5G RAN 103 may include, for example, throughput metrics (e.g., average throughput over a given time window, peak throughput over a given time window, raw throughput values, etc.), latency metrics (e.g., average latency over a given time window, peak latency over a given time window, raw latency values, etc.), jitter metrics, packet loss and/or error metrics, one or more scores associated with a performance associated with 5G RAN 103, and/or other metrics associated with the performance of traffic communicated via 5G RAN 103. Load metrics may include, for example, RF capacity metrics (e.g., an amount of RF resources, such as Physical Resource Blocks ("PRBs"), associated with 5G RAN 103 that are available and/or utilized), throughput capacity metrics (e.g., a total amount of traffic throughput that can be supported by 5G RAN 103, an amount of such traffic throughput that is available and/or utilized, etc.), a quantity of UEs connected to 5G RAN 103, one or more scores associated with an amount of utilization and/or capacity of 5G RAN 103, and/or other suitable metrics associated with a network load of 5G RAN 103.

Based on the received (at 102) information, RPDS 107 may determine (at 104) that the performance and/or load metrics exceed one or more thresholds. For example, RPDS 107 may determine whether one of the received metrics exceed a particular threshold (e.g., average throughput above a threshold throughput, maximum latency below a threshold latency, etc.), whether multiple of the received metrics exceed respective thresholds (e.g., average throughput above a threshold throughput and maximum latency below a threshold latency, maximum throughput above a threshold throughput and average latency below a threshold latency, etc.), and/or may otherwise determine whether the received metrics exceed one or more thresholds. In some embodiments, RPDS 107 may generate one or more scores based on the received metrics, and may compare the generated score(s) to one or more respective threshold scores.

In some embodiments, the thresholds may be determined using analytical techniques such as artificial intelligence and/or machine learning ("AI/ML") learning techniques. For example, RPDS 107 may receive feedback information indicating whether the operations performed by RPDS 107 (e.g., the determination (at 104) of whether performance and/or load metrics exceed particular thresholds, the notifying (at 106) of UEs of a 5G RAN preference as described below, and/or other operations) resulted in increased performance metrics, an improved user experience, and/or other improvements. RPDS 107 may adjust (e.g., increase and/or decrease) such thresholds based on such feedback information, in order to refine the thresholds to optimize the yield of the operations performed by RPDS 107 (e.g., increased performance metrics, improved user experience, etc.).

Once RPDS 107 determines (at 104) that suitable performance and/or load metrics exceed one or more respective thresholds, RPDS 107 may notify (at 106) UE 101 that 5G RAN 103 is "preferred" over WiFi network 105. The term "preferred," as used herein, may refer to the prioritization, classification, etc. of one network or type of network (e.g., a licensed network, such as 5G RAN 103) over another network or type of network (e.g., an unlicensed network, such as WiFi network 105). The notification may, in some embodiments, not include any specific reference to a "non-preferred" network. For example, the notification (at 106) may include an indication that 5G RAN 103 is "preferred," but may not include an indication that WiFi network 105 (or any other network) is "not preferred" or is "non-preferred." In some embodiments, the notification may include a ranking of networks, such as an indication that 5G RAN 103 is ranked higher than WiFi network 105. In some embodiments, the indication of whether a network is preferred and/or is non-preferred may include a binary indicator or "flag."

In some embodiments, the notification of the 5G RAN preference may include information associated with one or more cells or base stations associated with 5G RAN 103. Such information may include, for example, a cell identifier associated with one or more base stations associated with 5G RAN 103 for which RPDS 107 has received (at 102) performance and/or load metrics and/or has determined (at 104) that such metrics exceed respective thresholds, one or more frequencies, bands, radio access technologies ("RATs"), and/or other attributes of such base stations. In some embodiments, RPDS 107 may output (at 106) such notification directly to UE 101 and/or one or more other UEs that are in communication range of 5G RAN 103 via an API or other suitable communication pathway.

Additionally, or alternatively, RPDS 107 may, as described below with respect to FIG. 4, output such notification to one or more base stations of 5G RAN 103, which may in turn broadcast or otherwise notify one or more UEs 101 that are within communication range of 5G RAN 103 that 5G RAN 103 is "preferred" (e.g., preferred over one or more particular networks, preferred over one or more other types of networks such as unlicensed networks, etc.).

Based on receiving the notification, UE 101 may connect (at 108) to 5G RAN 103. For example, as discussed below with respect to FIG. 5, UE 101 may identify the presence and/or availability of 5G RAN 103, and may connect to 5G RAN 103 based on such identification. In some embodiments, in conjunction with and/or based on the connection to 5G RAN 103, UE 101 may disconnect (at 108) from WiFi network 105 (e.g., may terminate an active connection from WiFi network 105), may deactivate one or more wireless radios associated with a RAT via which UE 101 communicates with WiFi network 105 (e.g., one or more WiFi radios associated with UE 101), may place a connection between UE 101 and WiFi network 105 in an "idle" or "standby" mode, and/or may otherwise refrain from sending and/or receiving traffic from WiFi network 105.

Based on connecting to 5G RAN 103, UE 101 may, as discussed above, receive higher levels of performance (e.g., higher throughput, lower latency, etc.) from 5G RAN 103 than may be available via WiFi network 105. Additionally, or alternatively, UE 101 may be able to communicate (at 110) with MEC 109 via 5G RAN 103 and/or some other resource that is included in, implemented by, and/or communicatively coupled to 5G RAN 103, but which may be otherwise inaccessible from WiFi network 105. For example, UE 101 may communicate with MEC 109 to leverage the processing resources of MEC 109 with the low latency capabilities of 5G RAN 103 to deliver processing resource-intensive computations to UE 101 in real time or near-real time.

Figure 2:
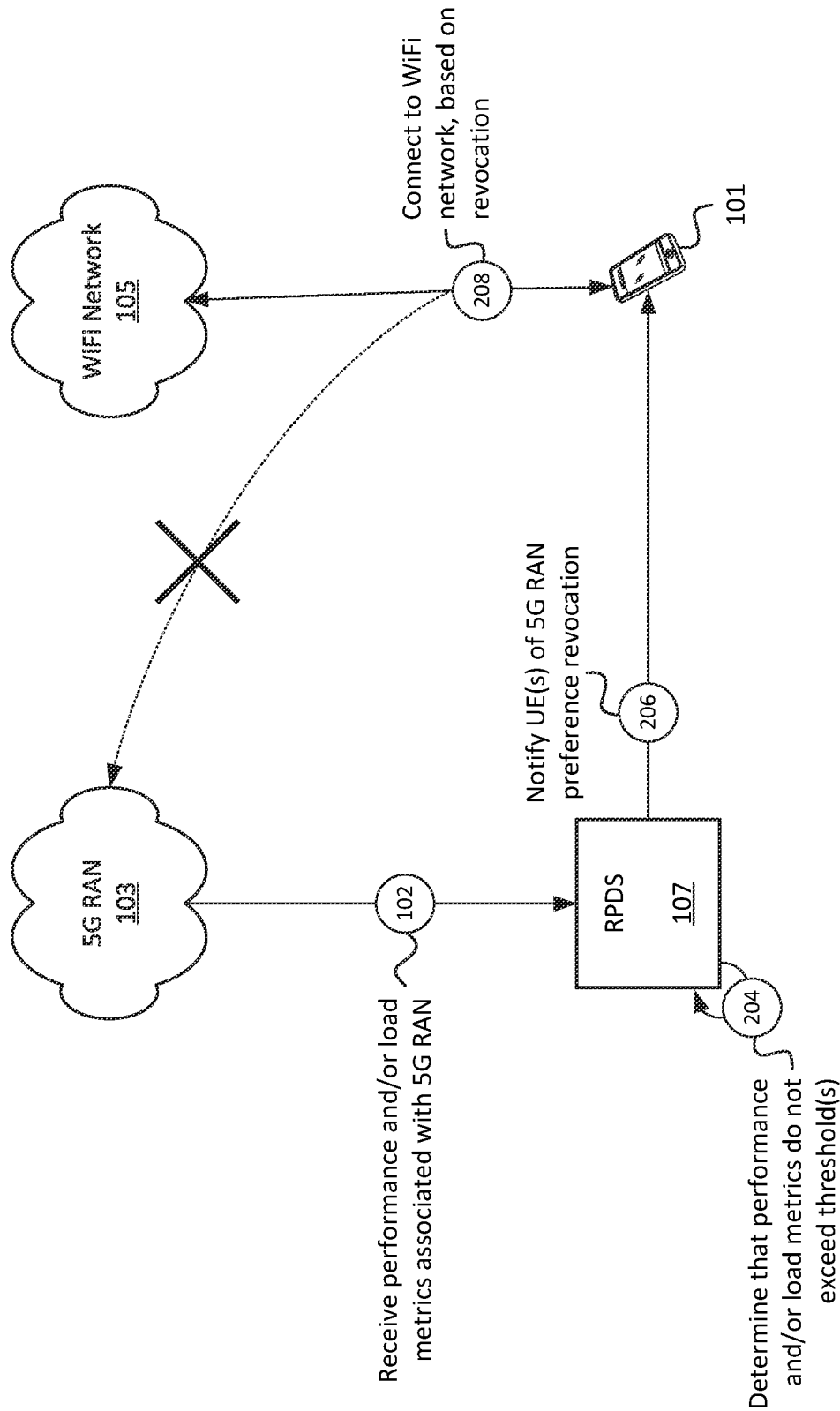

RPDS 107 may also instruct UE 101 to de-prioritize 5G RAN 103, to connect to another type of network, and/or to otherwise refrain from connecting to 5G RAN 103 when performance and/or load metrics associated with 5G RAN 103 are below respective thresholds. For example, as shown in FIG. 2 and as similarly discussed above, RPDS 107 may receive (at 102) performance and/or load metrics associated with 5G RAN 103. In this example, RPDS 107 may determine (at 204) that some or all of the received metrics do not exceed respective thresholds (e.g., in contrast with the scenario described above with respect to FIG. 1).

Accordingly, RPDS 107 may output (at 206) UE 101 and/or other UEs connected to 5G RAN 103 a revocation of the indicated 5G RAN preference. As similarly described above, such notification (at 206) may be communicated to UE 101 via an API or other type of direct messaging from RPDS 107 to UE 101, and/or may be broadcast or otherwise output by a given base station associated with 5G RAN 103 (e.g., a base station with which the received (at 102) metrics are associated). For example, the revocation may include a message or indication that 5G RAN 103 is not preferred, is non-preferred, and/or is ranked lower than one or more other networks or types of networks. Additionally, or alternatively, the revocation may include a removal or modification of a flag or indicator associated with 5G RAN 103, where such flag or indicator is used to identify whether 5G RAN 103 is a preferred network or not.

Based on receiving (at 206) the notification of the revocation of 5G RAN 103 as a preferred network, UE 101 may connect (at 208) from 5G RAN 103, and may connect to WiFi network 105. Connecting to WiFi network 105 in such situations may provide improved network efficiency for 5G RAN 103 (e.g., in situations where 5G RAN 103 is overloaded) and/or improved user experience for UE 101 (e.g., where performance metrics associated with 5G RAN 103 are below a threshold).

Figure 3:
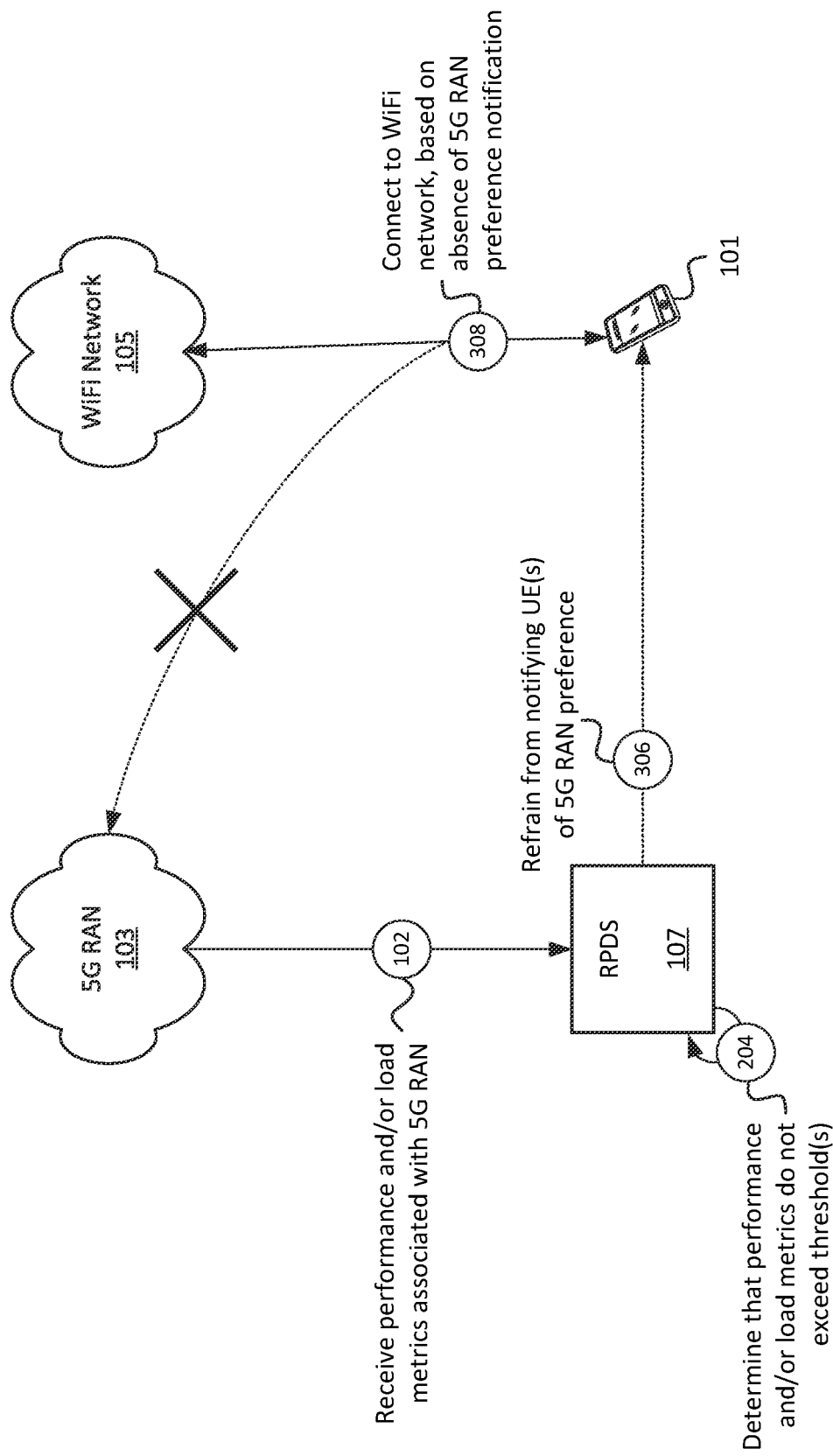

As shown in FIG. 3, RPDS 107 may refrain (at 306) from notifying UE 101 of the revocation of 5G RAN 103 as a preferred network. For example, RPDS 107 may refrain from outputting a notification to UE 101 via an API or other suitable communication pathway, and/or may refrain from notifying 5G RAN 103 that 5G RAN 103 is a preferred network (e.g., in embodiments where 5G RAN 103 notifies UE 101 that 5G RAN 103 is a preferred network, and 5G RAN 103 in turn notifies one or more UEs 101 within communication range that 5G RAN 103 is a preferred network). As such, in the absence of any such notification, UE 101 may connect (at 308) to WiFi network 105 when in range of WiFi network 105. In some embodiments, UE 101 may make such connection automatically, without regard to the availability or performance of 5G RAN 103. In some embodiments, the absence of notification of preference of 5G RAN 103 may include an absence of a notification of the presence of 5G RAN 103 (e.g., one or more base stations associated with 5G RAN 103 may not include a cell identifier or other identifier associated with a given base station of 5G RAN 103), where such absence may cause UE 101 to not scan for and/or identify the presence of 5G RAN 103.

Figure 4:
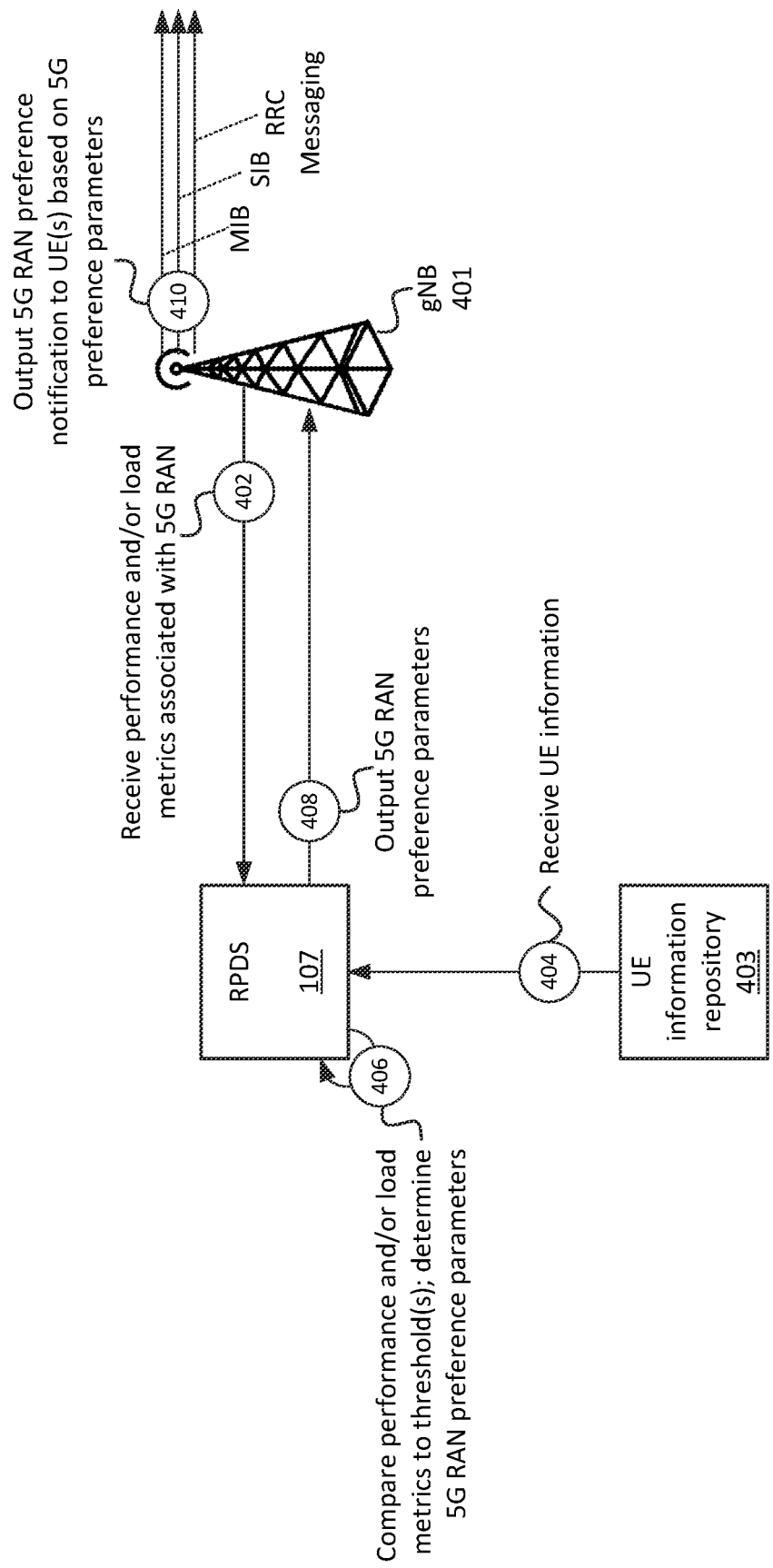
FIG. 4 illustrates an example of a determination and output of licensed network preference parameters, in accordance with some embodiments.

FIG. 4 provides an example, in accordance with some embodiments, of communications between RPDS 107 and 5G RAN 103, in order to determine that 5G RAN 103 is a preferred network and to notify UEs 101 (e.g., UEs 101 that are in communication range of 5G RAN 103) that 5G RAN 103 is a preferred network. For example, RPDS 107 may receive (at 402) performance and/or load metrics associated with Next Generation Node B ("gNB") 401, which may be a particular base station associated with 5G RAN 103. As noted above, RPDS 107 may receive (at 402) the metrics from gNB 401 (e.g., via an X2 interface or some other suitable communication pathway) and/or from some other device or system that collects and/or provides such information.

As further shown, RPDS 107 may receive (at 404) UE information from UE information repository 403. In some embodiments, UE information repository 403 may include, may be implemented by, and/or may be communicatively coupled to a Home Subscriber Server ("HSS"), a Unified Data Management function ("UDM"), and/or some other device or system that performs operations related to the maintaining and/or providing of information regarding UEs 101 and/or users associated with such UEs 101. For example, RPDS 107 may receive (at 404) Quality of Service ("QoS") information associated with respective UEs 101, priority classes associated with respective UEs 101, group identifiers associated with UEs 101, etc. For example, a first UE 101 may be associated with a "high QoS" category, while a second UE 101 may be associated with a "normal QoS" category. As another example, a first UE 101 may be associated with a "first responder" priority class, and a second UE 101 may be not be associated with "first responder" priority class.

When comparing the performance and/or load metrics (at 406) to respective thresholds, RPDS 107 may use different thresholds for different classes, groups, etc. of UEs 101. For example, a first threshold may be associated with a "first responder" priority class, while a second threshold may be associated with one or more other priority classes. Thus, situations may arise where one threshold is met, while another threshold is not met. For example, the load and/or performance metrics may exceed the first threshold (associated with the "first responder" class) but may not exceed the second threshold. As such, RPDS 107 may determine that UEs 101 that are associated with the "first responder" class should connect to gNB 401 when in range of gNB 401 (e.g., gNB 401 may be associated with a preferred network with respect to such UEs 101), while UEs 101 that are not associated with the "first responder" class should not connect to gNB 401 when another network or type of network (e.g., WiFi network 105) is in range of such UEs 101. As such, RPDS 107 may determine (at 406) preference parameters, which may indicate particular UEs 101, groups or categories of UEs 101, etc. for which 5G RAN 103 (e.g., gNB 401) is preferred, and/or particular UEs 101, groups or categories of UEs 101, etc. for which 5G RAN 103 is not preferred.

RPDS 107 may output (at 408) the determined preference parameters to gNB 401, which may in turn output (at 410) a preference notification to one or more UEs 101 within communication range of gNB 401. For example, gNB 401 may output (at 410) such parameters via a Master Information Block ("MIB"), a System Information Block ("SIB"), Radio Resource Control ("RRC") messaging directed to particular UEs 101, and/or in some other suitable manner. For example, gNB 401 may broadcast (e.g., via MIB, SIB, or other type of broadcast) an indication of particular UEs 101, groups or categories of UEs 101, etc. for which 5G RAN 103 (e.g., gNB 401) is preferred, and/or may directly output messages to such UEs 101, groups or categories of UEs 101, etc.

Figure 5:
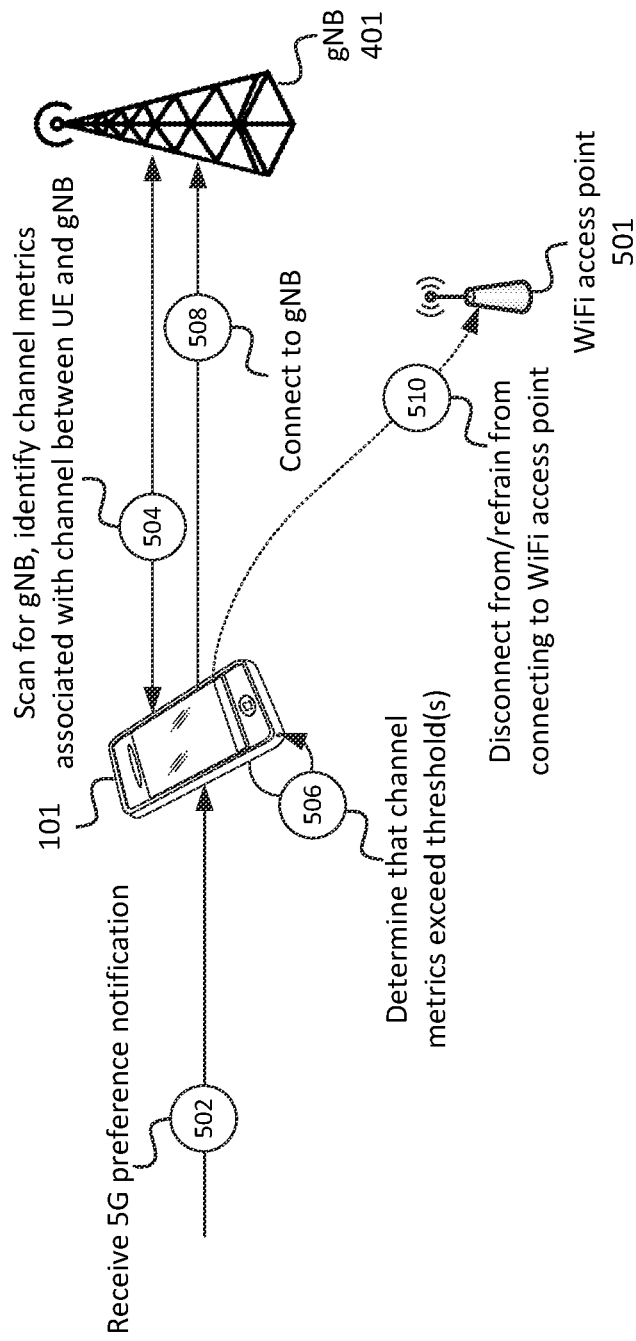
FIG. 5 illustrates an example determination by a UE to connect to a licensed network in lieu of an unlicensed network based on receiving a licensed network preference notification, in accordance with some embodiments.

FIG. 5 illustrates the connection of a particular UE 101 to gNB 401, based on a received indication of preference of gNB 401. As shown, for example, UE 101 may receive (at 502) a notification indicating a preference for gNB 401, for a RAT or frequency band associated with gNB 401, and/or other indicator that UE 101 should connect to gNB 401 in lieu of to another type of network (e.g., WiFi network 105, which may be implemented or provided by WiFi access point 501. As noted above, such notification may be received as a broadcast (e.g., MIB, SIB, or other broadcast) from gNB 401 and/or from another base station (e.g., a neighboring gNB 401), and/or as direct messaging from gNB 401, RPDS 107, or some other source.

Based on the received notification, UE 101 may scan (at 504) for gNB 401, and may identify channel metrics associated with a channel between UE 101 and gNB 401. For example, UE 101 may determine one or more measures of signal quality, such as signal to noise ratio ("SNR") metrics, Signal-to-Interference-and-Noise-Ratio ("SINR") metrics, Received Signal Strength Indicator ("RSSI") metrics, Reference Signal Receive Power ("RSRP") metrics, Reference Signal Received Quality ("RSRQ") metrics, Channel Quality Indicator ("CQI") metrics, and/or other measures of channel or signal quality. In some embodiments, channel metrics may include and/or may be based on measures of traffic performance, such as throughput, latency, jitter, packet error rate, packet loss rate, and/or other suitable metrics or values.

UE 101 may further compare the channel metrics (and/or one or more scores or values derived thereof) too one or more thresholds, and may determine (at 506) that the channel metrics exceed one or more thresholds. Based on determining (at 506) that the channel metrics exceed the one or more thresholds, UE 101 may connect (at 508) to gNB 401. In some embodiments, UE 101 may disconnect (at 510) from WiFi access point 501 and/or may refrain from connecting to WiFi access point 501 based on the indication the gNB 401 is a preferred network and/or is associated with a preferred RAT, frequency, frequency band, etc.

Figure 6:
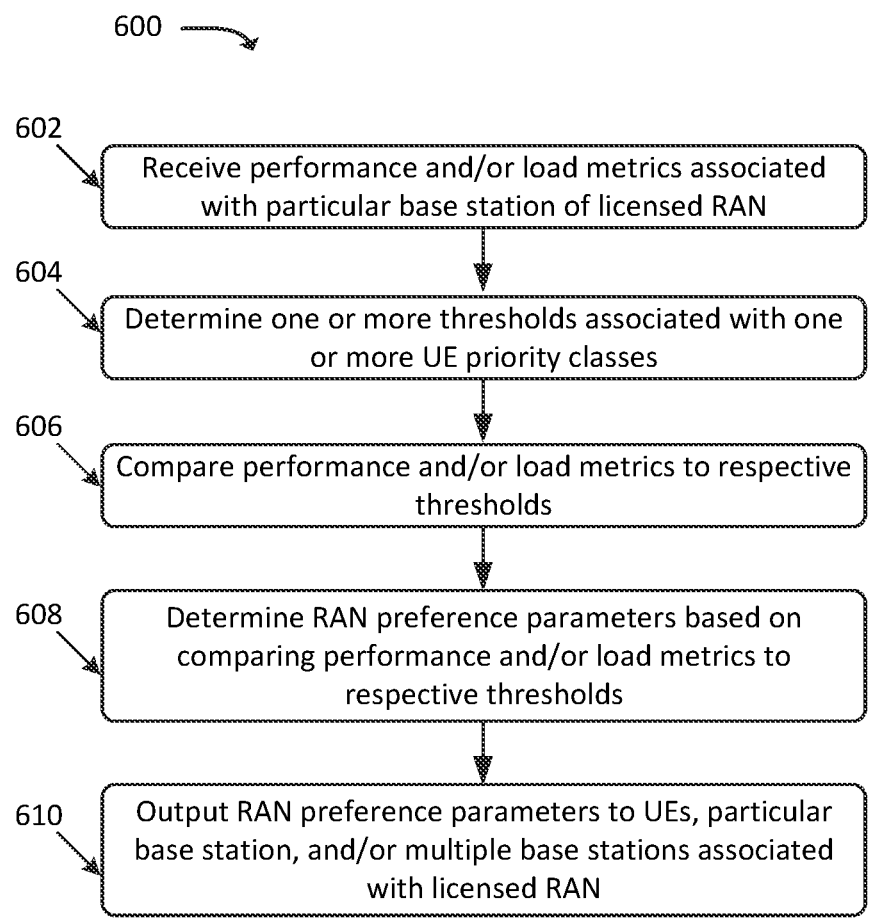
FIG. 6 illustrates an example process for determining and outputting a RAN preference to one or more UEs.

FIG. 6 illustrates an example process 600 for determining and outputting a RAN preference to one or more UEs 101. In some embodiments, some or all of process 600 may be performed by RPDS 107. In some embodiments, one or more other devices may perform some or all of process 600 in concert with, and/or in lieu of, RPDS 107. While the process 600 is provided in the context of a single base station, the same or similar operations may be performed with respect to multiple base stations.

As shown, process 600 may include receiving (at 602) performance and/or load metrics associated with a particular base station of a particular RAN (e.g., gNB 401 associated with 5G RAN 103, and/or some other type of base station associated with some other type of RAN). For example, as discussed above, RPDS 107 may monitor, determine, receive, etc. such metrics from the particular base station and/or from some other device or system that monitors and/or provides such information.

Process 600 may further include determining (at 604) one or more thresholds associated with one or more UE priority classes, categories, etc. For example, as discussed above, RPDS 107 may receive UE information from UE information repository 403, indicating priority classes, thresholds (e.g., thresholds for performance and/or load metrics associated with the base station) associated with such priority classes, and/or other suitable information. In some embodiments, RPDS 107 may determine the thresholds for respective priority classes using AI/ML techniques or other suitable techniques, as discussed above.

Process 600 may additionally include comparing (at 606) the performance and/or load metrics to respective thresholds. For example, as discussed above, RPDS 107 may determine whether the performance and/or load metrics (and/or one or more values or scores derived therefrom) exceed one or more the determined thresholds. For example, RPDS 107 may determine that the performance and/or load metrics exceed a first threshold associated with a first priority class, while determining that the performance and/or load metrics do not exceed a second threshold associated with a second priority class. In some situations, RPDS 107 may determine that the performance and/or load metrics exceed multiple respective thresholds associated with multiple priority classes, groups, categories, etc. In some embodiments, RPDS 107 may compare the performance and/or load metrics to one threshold (or one set of thresholds) that is not associated with any particular priority class, group, etc.

Process 600 may also include determining (at 608) RAN preference parameters based on comparing the performance and/or load metrics to the respective thresholds. For example, RPDS 107 may determine that the particular base station, and/or a RAN with which the base station is associated, should be a "preferred" network for particular priority classes, groups, etc. for which the respective thresholds are exceeded. In some embodiments, RPDS 107 may identify one or more additional base stations associated with the particular base station, such as "neighbor" base stations (e.g., which may be indicated in a Neighbor Cell List ("NCL") list associated with the particular base station, may be identified based on being located within a threshold proximity to a geographical location of the particular base station, etc.).

In some embodiments, RPDS 107 may identify an "anchor" base station associated with the particular base station, and output the RAN preference parameters to the anchor base station. For example, the particular base station may be a gNB 401 associated with 5G RAN 105, which may be associated with an evolved Node B ("eNB") of a LTE RAN that serves as an anchor for gNB 401. An "anchor" may be a base station to which UE 101 may connect and/or remain connected (e.g., in an "idle" mode, in a "camped" status, etc.) while connected to and/or attempting to connect to gNB 401.

Process 600 may further include outputting (at 610) the RAN preference parameters to one or more UEs 101 and/or base stations. For example, as noted above, RPDS 107 may output the RAN preference parameters to the particular base station (e.g., the base station for which the performance and/or load metrics were received), one or more neighboring base stations (e.g., which may in turn notify UEs 101 within communication range of such one or more base stations of the RAN preference parameters), and/or one or more UEs 101 connected to the particular base station. As discussed above, the particular base station (and/or neighboring base stations) may communicate the RAN preference parameters to one or more UEs 101 within communication range by way of broadcast messaging (e.g., a MIB, a SIB, or some other type of broadcast) and/or direct messaging (e.g., RRC messaging directed to particular UEs as indicated by or determined based on the RAN preference parameters). Accordingly, as discussed above, such UEs 101 may connect to the particular base station (e.g., a base station implementing a licensed RAT) in lieu of, or in addition to, a different wireless network (e.g., a base station associated with a different licensed RAT, WiFi access point 501 implementing an unlicensed wireless network such as a WiFi network, etc.).

Figure 7:
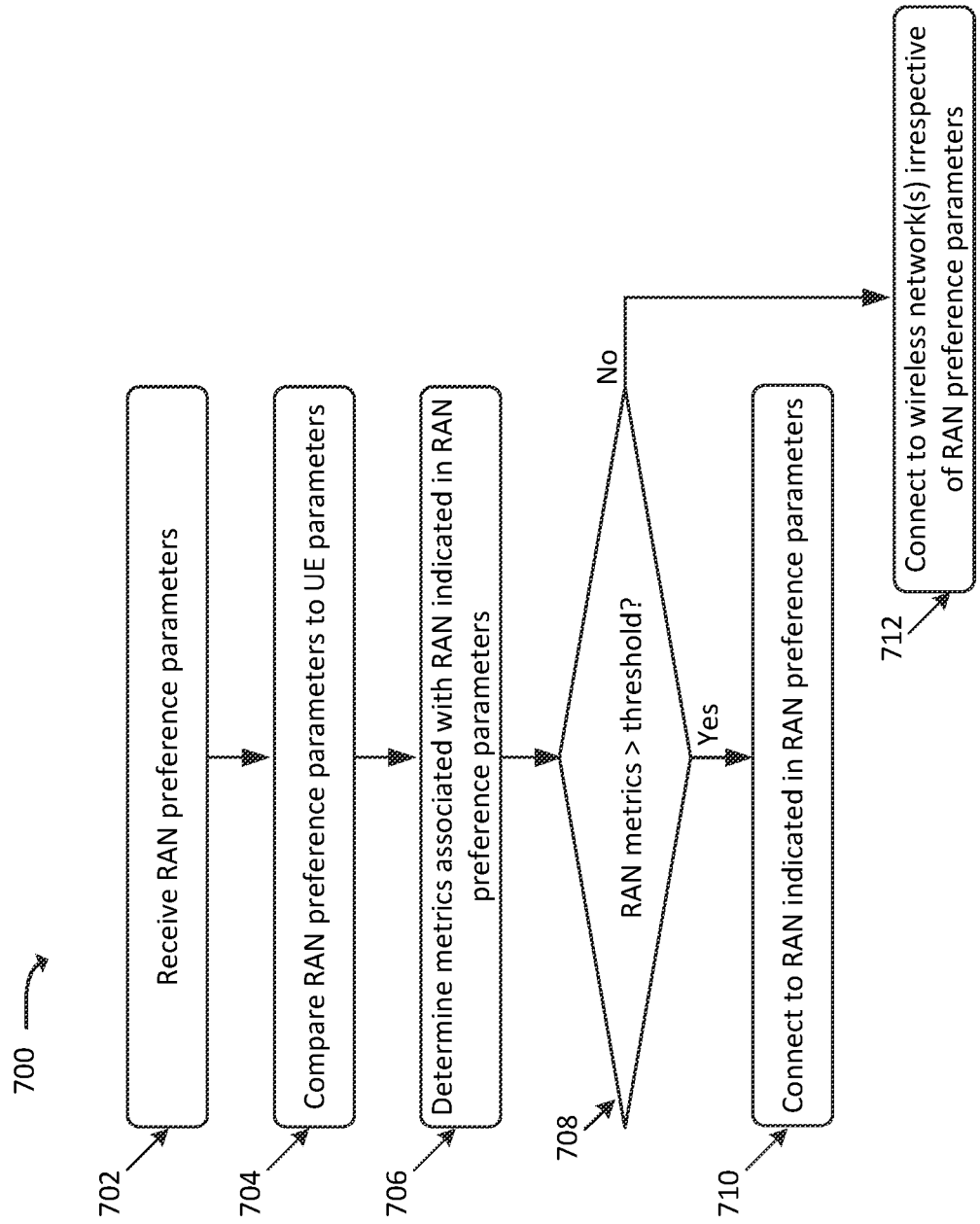
FIG. 7 illustrates an example process for determining and connecting to a particular wireless network based on a received RAN preference.

FIG. 7 illustrates an example process 700 for determining and connecting to a particular wireless network based on a received RAN preference. In some embodiments, some or all of process 700 may be performed by UE 101. In some embodiments, one or more other devices may perform some or all of process 700 in concert with, and/or in lieu of, UE 101.

As shown, process 700 may include receiving (at 702) RAN preference parameters. For example, as discussed above, UE 101 may receive RAN preference parameters via a MIB, a SIB, RRC messaging, an API, and/or some other suitable communication pathway. The RAN preference parameters may indicate, for example, one or more RATs, frequency bands, base stations (e.g., a cell identifier of one or more base stations), and/or other information that may be used by UE 101 to scan for and/or detect a given base station associated with the preferred RAN. In some embodiments, the RAN preference parameters may include indicators of particular UEs 101, groups of UEs 101, priority classes, etc. with which the RAN preference parameters are associated.

Process 700 may further include comparing (at 704) the RAN preference parameters to UE parameters. For example, UE 101 may determine whether UE 101 is in a priority class associated with the RAN preference parameters. Such priority information may be determined based on information stored and/or provided by a Universal Integrated Circuit Card ("UICC") associated with UE 101, a SIM ("Subscriber Identification Module") card associated with UE 101, and/or other suitable type of storage and/or authentication device associated with UE 101.

Process 700 may additionally include determining (at 706) metrics associated with the RAN indicated in the RAN preference parameters. For example, UE 101 may scan for a presence of a base station identified in the RAN preference parameters (e.g., a particular base station having a cell identifier indicated in the RAN preference parameters, a base station implementing one or more RATs and/or frequency bands indicated in the RAN preference parameters, etc.), and/or may determine one or more measures of performance and/or signal quality associated with such base station. For example, UE 101 may determine measures of SINR, RSRQ, RSRP, or the like associated with a channel between UE 101 and the base station.

Process 700 may also include determining (at 708) whether the RAN metrics exceed one or more thresholds. For example, UE 101 may determine whether the measures of SINR, RSRQ, RSRP, etc. (and/or one or more values derived therefrom) exceed one or more thresholds. If the RAN metrics exceed the one or more thresholds (at 708—YES), then UE 101 may connect (at 710) to the RAN indicated in the RAN preference parameters. For example, UE 101 may output an Attach Request or other suitable type of message to initiate or request a connection with the base station associated with the preferred RAN.

If, on the other hand, the RAN metrics do not exceed the one or more thresholds (at 708—NO), then UE 101 may connect (at 712) to, and/or may remain connected to, one or more wireless networks irrespective of the RAN preference parameters. For example, UE 101 may connect to a different wireless network (e.g., WiFi network 105, a different licensed network than indicated in the RAN preference parameters, and/or some other wireless network).

In some situations, UE 101 may connect to the RAN indicated in the RAN preference parameters, even if the RAN metrics do not exceed the one or more thresholds. For example, another network (e.g., WiFi network 105) may not be available to UE 101, may reject a connection request from UE 101, may exhibit lower measures of performance than the indicated RAN, etc. In this manner, although UE 101 may connect to the indicated RAN, such connection may be irrespective of (e.g., independent of) the received RAN preference parameters.

Figure 8:
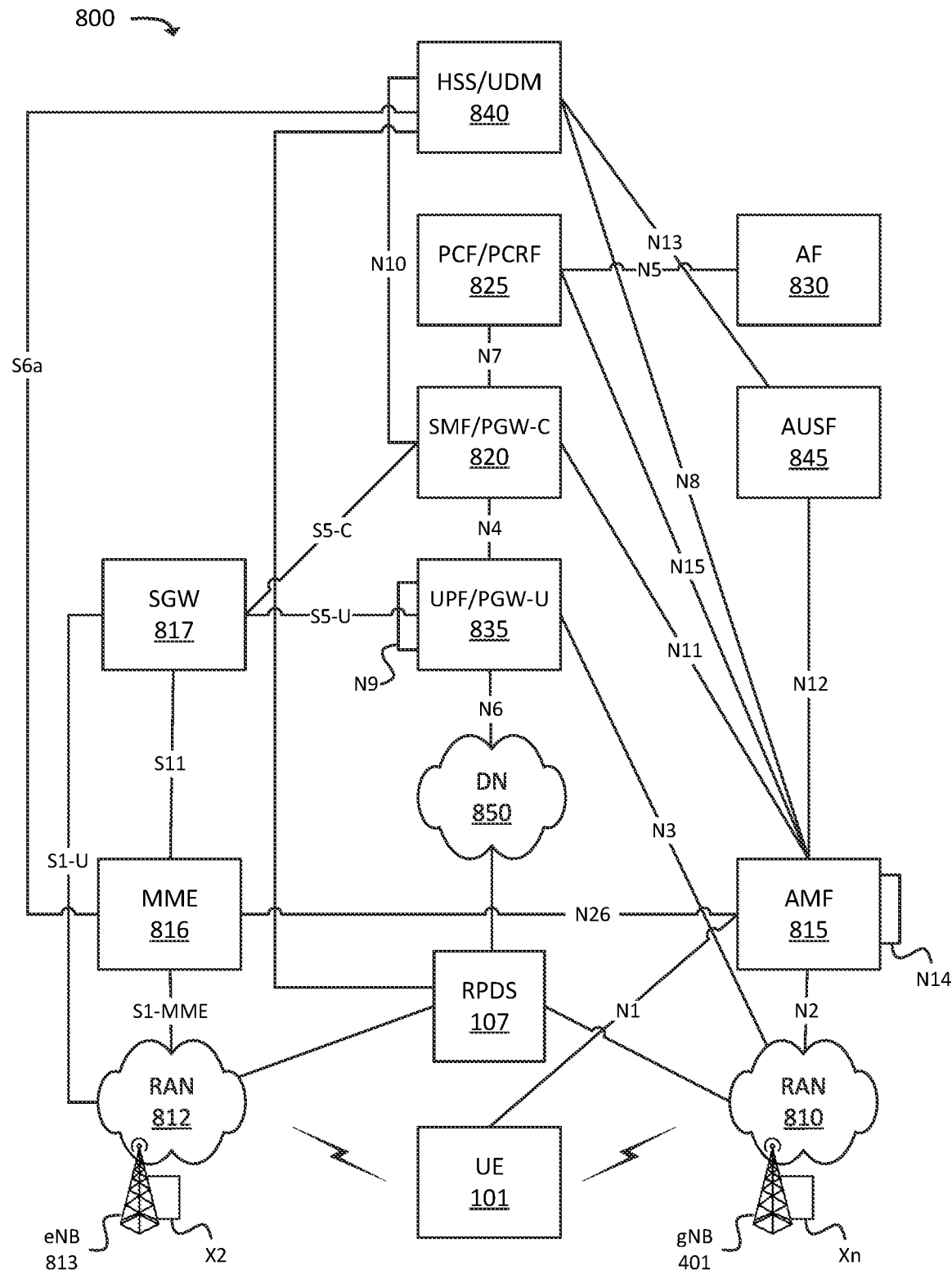
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 101, RAN 810 (which may include one or more Next Generation Node Bs ("gNBs") 401), RAN 812 (which may include one or more one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as RPDS 107.

The example shown in FIG. 8 illustrates one instance of each network component or function (e.g., one instance of SMF/PGW-C 820, PCF/PCRF 825, UPF/PGW-U 835, HSS/UDM 840, and/or 845). In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or 845, while another slice may include a second instance of SMF/PGW-C 820, PCF/PCRF 825, UPF/PGW-U 835, HSS/UDM 840, and/or 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 101 may include a computation and communication device, such as a wireless mobile communication device that is capable of communicating with RAN 810, RAN 812, and/or DN 850. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 101 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 401), via which UE 101 may communicate with one or more other elements of environment 800. UE 101 may communicate with RAN 810 via an air interface (e.g., as provided by gNB 401). For instance, RAN 810 may receive traffic (e.g., voice call traffic, data traffic, messaging traffic, signaling traffic, etc.) from UE 101 via the air interface, and may communicate the traffic to UPF/PGW-U 835, and/or one or more other devices or networks. Similarly, RAN 810 may receive traffic intended for UE 101 (e.g., from UPF/PGW-U 835, AMF 815, and/or one or more other devices or networks) and may communicate the traffic to UE 101 via the air interface.

RAN 812 may be, or may include, a LTE RAN that includes one or more base stations (e.g., one or more eNBs 813), via which UE 101 may communicate with one or more other elements of environment 800. UE 101 may communicate with RAN 812 via an air interface (e.g., as provided by eNB 813). For instance, RAN 810 may receive traffic (e.g., voice call traffic, data traffic, messaging traffic, signaling traffic, etc.) from UE 101 via the air interface, and may communicate the traffic to UPF/PGW-U 835, and/or one or more other devices or networks. Similarly, RAN 810 may receive traffic intended for UE 101 (e.g., from UPF/PGW-U 835, SGW 817, and/or one or more other devices or networks) and may communicate the traffic to UE 101 via the air interface.

AMF 815 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 810 and/or gNBs 401, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate in the establishment of communication sessions on behalf of UE 101. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 101, from DN 850, and may forward the user plane data toward UE 101 (e.g., via RAN 810, SMF/PGW-C 820, and/or one or more other devices). In some embodiments, multiple UPFs 835 may be deployed (e.g., in different geographical locations), and the delivery of content to UE 101 may be coordinated via the N9 interface (e.g., as denoted in FIG. 8 by the line marked "N9" originating and terminating at UPF/PGW-U 835). Similarly, UPF/PGW-U 835 may receive traffic from UE 101 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 101. In some embodiments, UE information repository 403 may be, may include, may be implemented by, and/or may be communicatively coupled to HSS/UDM 840 and/or AUSF 845.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 101 may communicate, through DN 850, with data servers, other UEs 101, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 101 may communicate.

Figure 9:
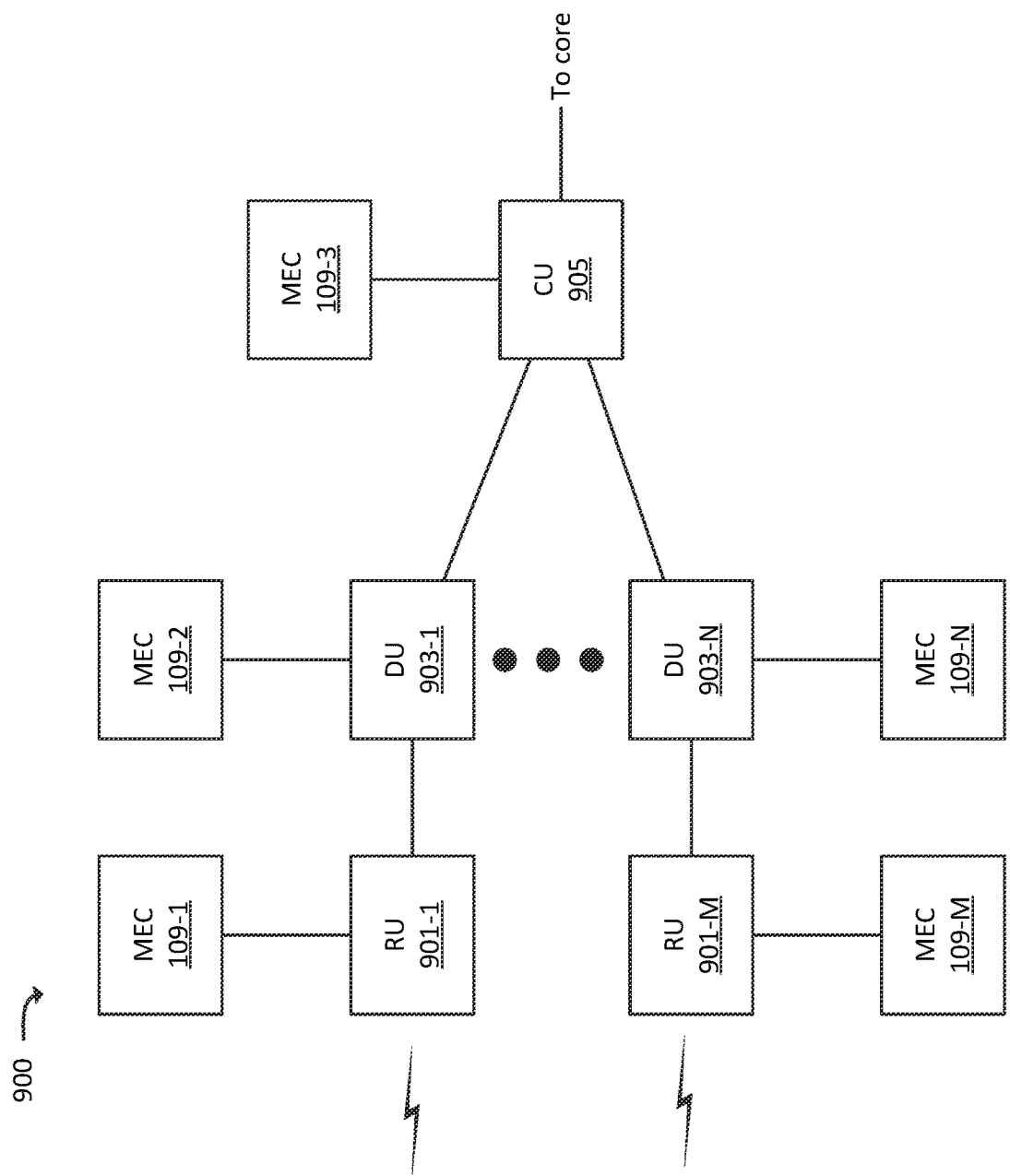
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810, RAN 812, or some other RAN). In some embodiments, a particular RAN may include one DU network 900. In some embodiments, a particular RAN may include multiple DU networks 900. In some embodiments, DU network 900 may correspond to a particular gNB 401 of a 5G RAN (e.g., RAN 810). In some embodiments, DU network 900 may correspond to multiple gNBs 401. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 101 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 101, and may determine which DU(s) 903 should receive the downlink traffic. DU 903 may include one or more devices that transmit traffic between a core network (e.g., via CU 905) and UE 101 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 101.

RU 901 may include hardware circuitry (e.g., one or more RF transceivers, antennas, radios, and/or other suitable hardware) to communicate wirelessly (e.g., via an RF interface) with one or more UEs 101, one or more other DUs 903 (e.g., via RUs 901 associated with DUs 903), and/or any other suitable type of device. In the uplink direction, RU 901 may receive traffic from UE 101 and/or another DU 903 via the RF interface and may provide the traffic to DU 903. In the downlink direction, RU 901 may receive traffic from DU 903, and may provide the traffic to UE 101 and/or another DU 903.

RUs 901 may, in some embodiments, be communicatively coupled to one or more MECs 109. For example, RU 901-1 may be communicatively coupled to MEC 109-1, RU 901-M may be communicatively coupled to MEC 109-M, DU 903-1 may be communicatively coupled to MEC 109-2, DU 903-N may be communicatively coupled to MEC 109-N, CU 905 may be communicatively coupled to MEC 109-3, and so on. MECs 109 may include hardware resources (e.g., configurable or provisionable hardware resources) that may be configured to provide services and/or otherwise process traffic to and/or from UE 101, via a respective RU 901.

For example, RU 901-1 may route some traffic, from UE 101, to MEC 109-1 instead of to a core network (e.g., via DU 903 and CU 905). MEC 109-1 may process the traffic, perform one or more computations based on the received traffic, and may provide traffic to UE 101 via RU 901-1. In this manner, ultra-low latency services may be provided to UE 101, as traffic does not need to traverse DU 903, CU 905, and an intervening backhaul network between DU network 900 and the core network. In some embodiments, MEC 109 may include, and/or may implement, some or all of the functionality described above with respect to RPDS 107.

Figure 10:
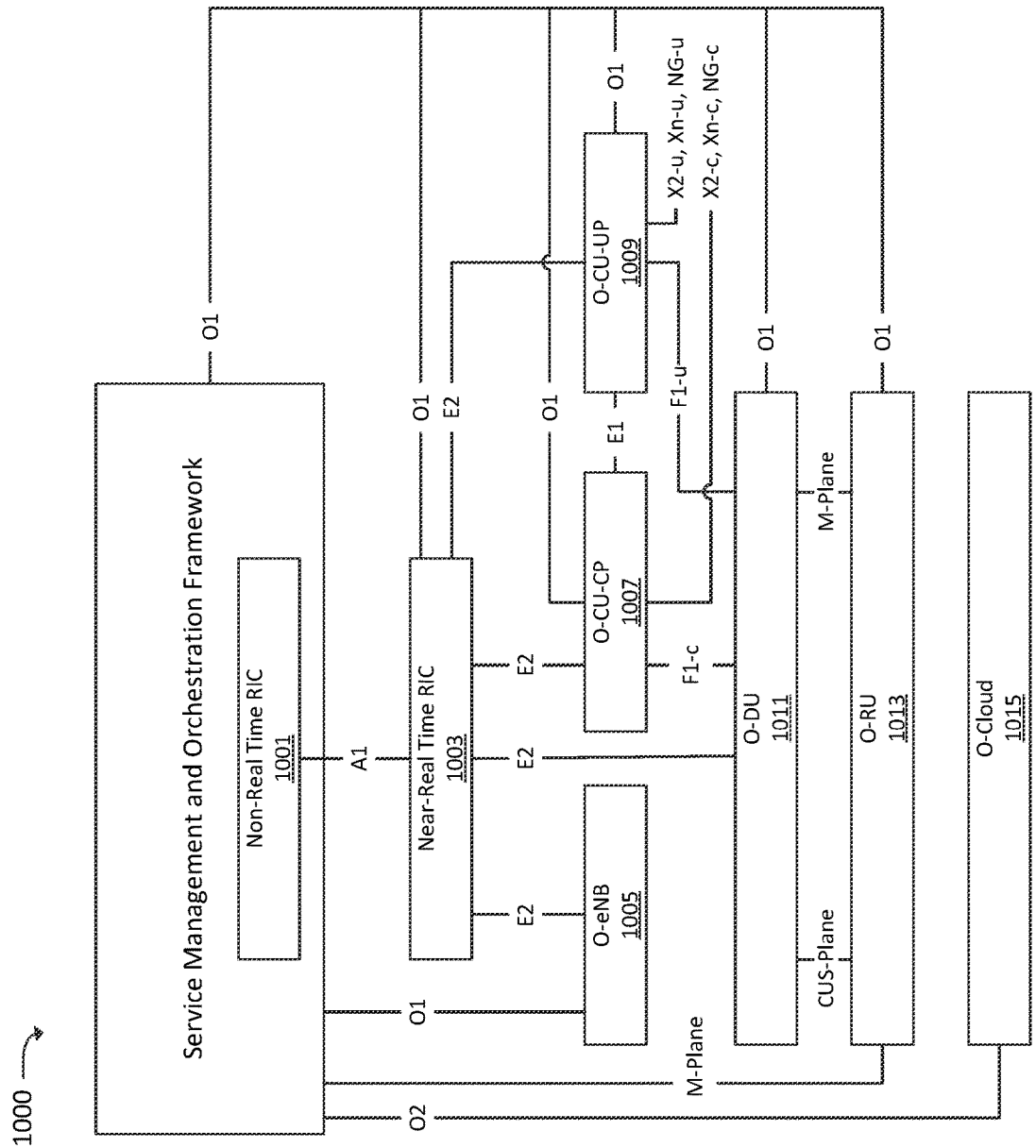
FIG. 10 illustrates an example arrangement of an Open RAN ("O-RAN") environment in which one or more embodiments, described herein, may be implemented.

FIG. 10 illustrates an example O-RAN environment 1000, which may correspond to RAN 810, RAN 812, and/or DU network 900. For example, RAN 810, RAN 812, and/or DU network 900 may include one or more instances of O-RAN environment 1000, and/or one or more instances of O-RAN environment 1000 may implement RAN 810, RAN 812, DU network 900, and/or some portion thereof. As shown, O-RAN environment 1000 may include Non-Real Time Radio Intelligent Controller ("RIC") 1001, Near-Real Time RIC 1003, O-eNB 1005, O-CU-Control Plane ("O-CU-CP") 1007, O-CU-User Plane ("O-CU-UP") 1009, O-DU 1011, O-RU 1013, and O-Cloud 1015. In some embodiments, O-RAN environment 1000 may include additional, fewer, different, and/or differently arranged components.

In some embodiments, some or all of the elements of O-RAN environment 1000 may be implemented by one or more configurable or provisionable resources, such as virtual machines, cloud computing systems, physical servers, and/or other types of configurable or provisionable resources. In some embodiments, some or all of O-RAN environment 1000 may be implemented by, and/or communicatively coupled to, one or more MECs 109.

Non-Real Time RIC 1001 and Near-Real Time MC 1003 may receive performance information (and/or other types of information) from one or more sources, and may configure other elements of O-RAN environment 1000 based on such performance or other information. For example, Near-Real Time RIC 1003 may receive performance information, via one or more E2 interfaces, from O-eNB 1005, O-CU-CP 1007, and/or O-CU-UP 1009, and may modify parameters associated with O-eNB 1005, O-CU-CP 1007, and/or O-CU-UP 1009 based on such performance information. Similarly, Non-Real Time RIC 1001 may receive performance information associated with O-eNB 1005, O-CU-CP 1007, O-CU-UP 1009, and/or one or more other elements of O-RAN environment 1000 and may utilize machine learning and/or other higher level computing or processing to determine modifications to the configuration of O-eNB 1005, O-CU-CP 1007, O-CU-UP 1009, and/or other elements of O-RAN environment 1000. In some embodiments, Non-Real Time RIC 1001 may generate machine learning models based on performance information associated with O-RAN environment 1000 or other sources, and may provide such models to Near-Real Time RIC 1003 for implementation.

O-eNB 1005 may perform functions similar to those described above with respect to eNB 813. For example, O-eNB 1005 may facilitate wireless communications between UE 101 and a core network. O-CU-CP 1007 may perform control plane signaling to coordinate the aggregation and/or distribution of traffic via one or more DUs 903, which may include and/or be implemented by one or more O-DUs 1011, and O-CU-UP 1009 may perform the aggregation and/or distribution of traffic via such DUs 903 (e.g., O-DUs 1011). O-DU 1011 may be communicatively coupled to one or more RUs 901, which may include and/or may be implemented by one or more O-RUs 1013. In some embodiments, O-Cloud 1015 may include or be implemented by one or more MECs 109, which may provide services, and may be communicatively coupled, to O-CU- CP 1007, O-CU-UP 1009, O-DU 1011, and/or O-RU 1013 (e.g., via an O1 and/or O2 interface).

Figure 11:
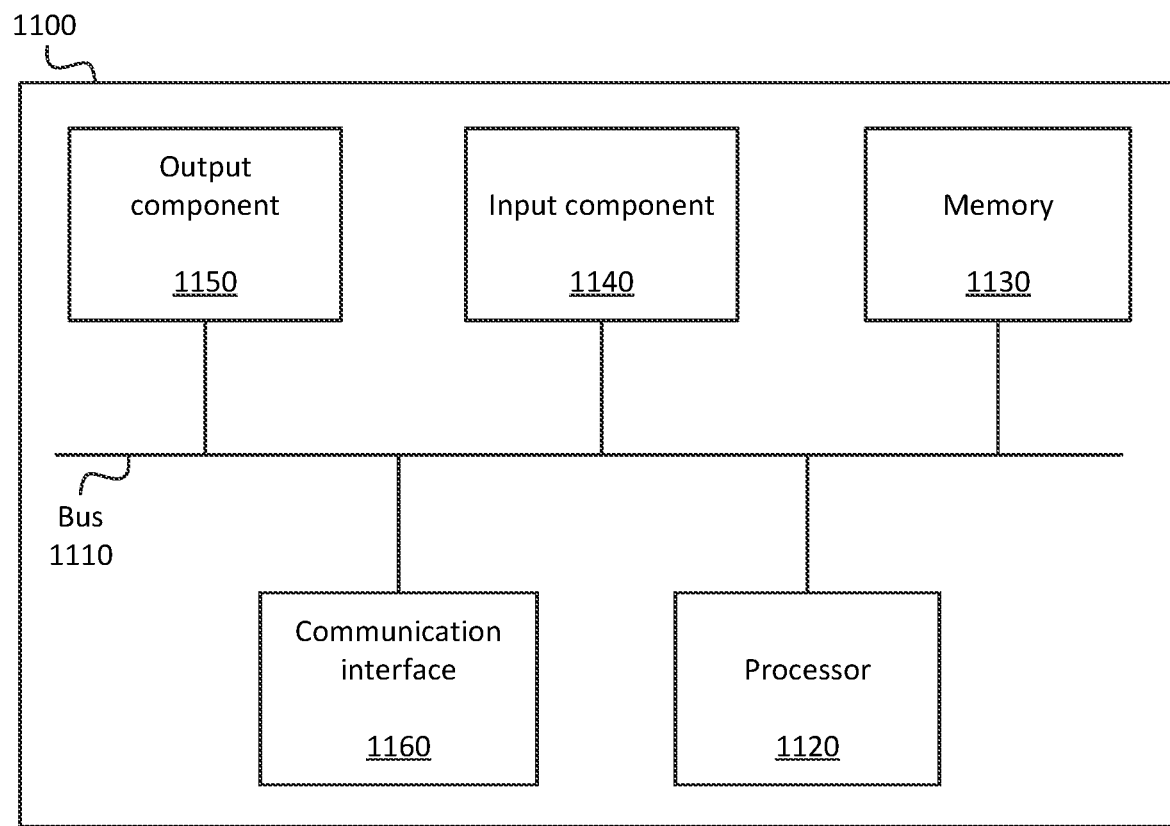
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7) the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive one or more metrics associated with a particular radio access network ("RAN");
determine that the received one or more metrics exceed one or more thresholds; and
output, to one or more base stations associated with the RAN and based on the determination that the one or more metrics exceed one or more thresholds, a RAN preference indication,
wherein the one or more base stations output the RAN preference indication to one or more User Equipment ("UEs") within communication range of the one or more base stations,
wherein the one or more UEs connect, based on the RAN preference indication, to the one or more base stations in lieu of to a wireless network that is different from the RAN.

2. The device of claim 1, wherein the RAN is associated with one or more licensed radio access technologies ("RATs"), wherein the wireless network that is different from the RAN is associated with one or more unlicensed RATs.

3. The device of claim 1, wherein the one or more metrics include at least one of:
performance metrics associated with a particular base station of the particular RAN, or
load metrics associated with the particular base station of the particular RAN.

4. The device of claim 3, wherein the RAN preference indication includes an identifier of the particular base station.

5. The device of claim 3, wherein outputting the RAN preference indication includes outputting the RAN preference indication to the particular base station of the particular RAN.

6. The device of claim 1, wherein the one or more base stations output the RAN preference indication via one or more of:
a Master Information Block ("MIB"), or
a System Information Block ("SIB").

7. The device of claim 1, wherein the one or more UEs are a first set of UEs, wherein a different second set of UEs are within communication range of the one or more base stations, wherein the RAN preference indication includes parameters associated with the first set of UEs and not the second set of UEs,
wherein the first set of UEs connect to the one or more base stations based on the parameters associated with the first set of UEs and not the second set of UEs, and
wherein the second set of UEs connect to the one or more base stations or the wireless network that is different from the RAN, irrespective of the RAN preference indication, based on the parameters associated with the first set of UEs and not the second set of UEs.

8. A non-transitory computer-readable medium, storing a plurality of processor-executable instructions to:
receive one or more metrics associated with a particular radio access network ("RAN");
determine that the received one or more metrics exceed one or more thresholds; and
output, to one or more base stations associated with the RAN and based on the determination that the one or more metrics exceed one or more thresholds, a RAN preference indication,
wherein the one or more base stations output the RAN preference indication to one or more User Equipment ("UEs") within communication range of the one or more base stations,
wherein the one or more UEs connect, based on the RAN preference indication, to the one or more base stations in lieu of to a wireless network that is different from the RAN.

9. The non-transitory computer-readable medium of claim 8, wherein the RAN is associated with one or more licensed radio access technologies ("RATs"), wherein the wireless network that is different from the RAN is associated with one or more unlicensed RATs.

10. The non-transitory computer-readable medium of claim 8, wherein the one or more metrics include at least one of:
performance metrics associated with a particular base station of the particular RAN, or
load metrics associated with the particular base station of the particular RAN.

11. The non-transitory computer-readable medium of claim 10, wherein the RAN preference indication includes an identifier of the particular base station.

12. The non-transitory computer-readable medium of claim 10, wherein outputting the RAN preference indication includes outputting the RAN preference indication to the particular base station of the particular RAN.

13. The non-transitory computer-readable medium of claim 8, wherein the one or more base stations output the RAN preference indication via one or more of:
a Master Information Block ("MIB"), or
a System Information Block ("SIB").

14. The non-transitory computer-readable medium of claim 8, wherein the one or more UEs are a first set of UEs, wherein a different second set of UEs are within communication range of the one or more base stations, wherein the RAN preference indication includes parameters associated with the first set of UEs and not the second set of UEs,
wherein the first set of UEs connect to the one or more base stations based on the parameters associated with the first set of UEs and not the second set of UEs, and
wherein the second set of UEs connect to the one or more base stations or the wireless network that is different from the RAN, irrespective of the RAN preference indication, based on the parameters associated with the first set of UEs and not the second set of UEs.

15. A method, comprising:
receiving one or more metrics associated with a particular radio access network ("RAN");
determining that the received one or more metrics exceed one or more thresholds; and
outputting, to one or more base stations associated with the RAN and based on the determination that the one or more metrics exceed one or more thresholds, a RAN preference indication, wherein the one or more base stations output the RAN preference indication to one or more User Equipment ("UEs") within communication range of the one or more base stations, wherein the one or more UEs connect, based on the RAN preference indication, to the one or more base stations in lieu of to a wireless network that is different from the RAN.

16. The method of claim 15, wherein the RAN is associated with one or more licensed radio access technologies ("RATs"), wherein the wireless network that is different from the RAN is associated with one or more unlicensed RATs.

17. The method of claim 15, wherein the one or more metrics include at least one of:
performance metrics associated with a particular base station of the particular RAN, or
load metrics associated with the particular base station of the particular RAN.

18. The method of claim 17, wherein the RAN preference indication includes an identifier of the particular base station, wherein outputting the RAN preference indication includes outputting the RAN preference indication to the particular base station of the particular RAN.

19. The method of claim 15, wherein the one or more base stations output the RAN preference indication via one or more of:
a Master Information Block ("MIB"), or
a System Information Block ("SIB").

20. The method of claim 15, wherein the one or more UEs are a first set of UEs, wherein a different second set of UEs are within communication range of the one or more base stations, wherein the RAN preference indication includes parameters associated with the first set of UEs and not the second set of UEs, wherein the first set of UEs connect to the one or more base stations based on the parameters associated with the first set of UEs and not the second set of UEs, and wherein the second set of UEs connect to the one or more base stations or the wireless network that is different from the RAN, irrespective of the RAN preference indication, based on the parameters associated with the first set of UEs and not the second set of UEs.

* * * * *